Figure 1:
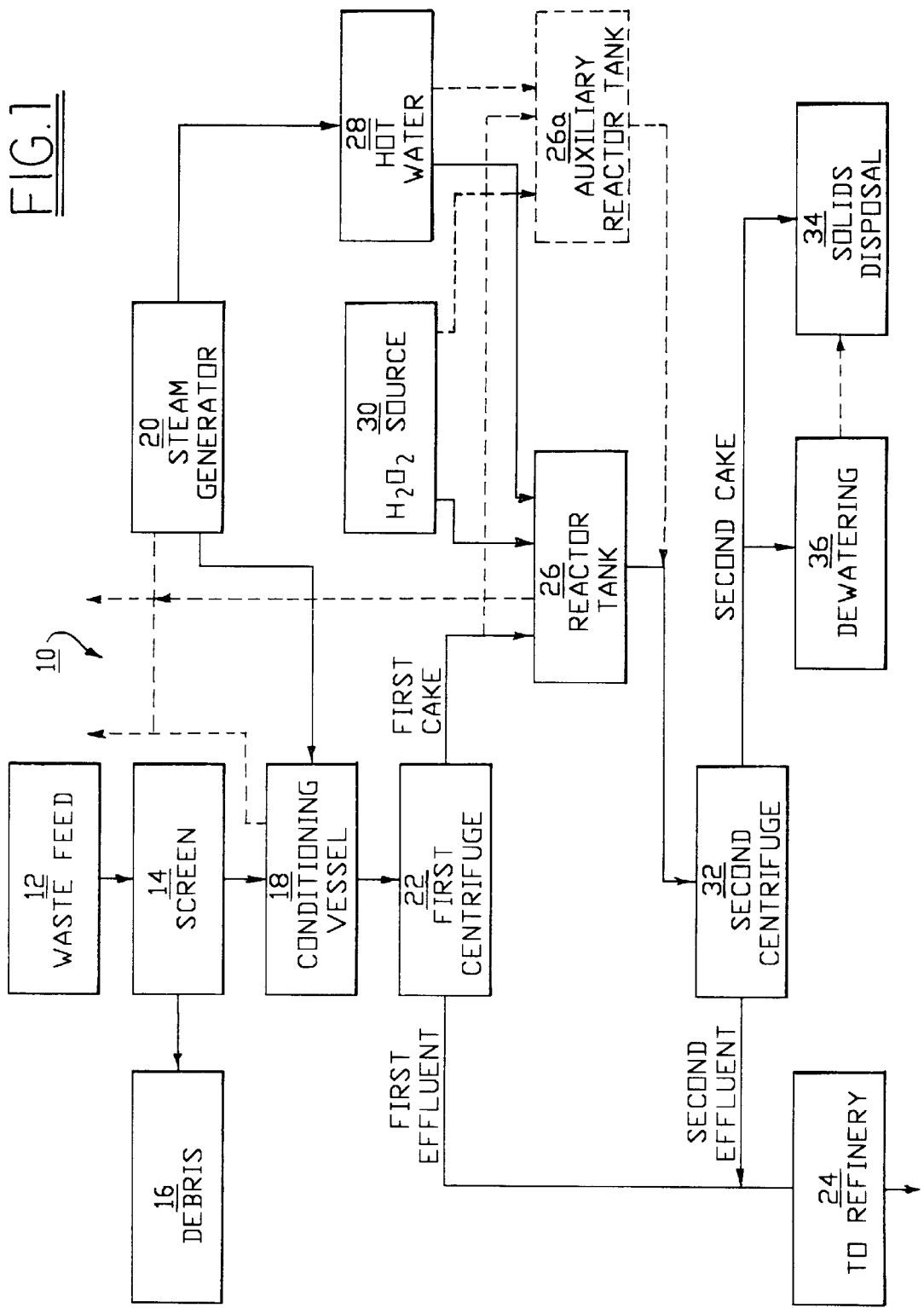

United States Patent

Conaway

[19]

[11] Patent Number: 5,928,522
[45] Date of Patent: Jul. 27, 1999

[54] METHOD FOR PROCESSING OIL REFINING WASTE

[75] Inventor: Lawrence M. Conaway, Youngstown, N.Y.

[73] Assignee: Continuum Invironmental, Inc., Youngstown, N.Y.

[21] Appl. No.: 08/971,514

[22] Filed: Nov. 17, 1997

Related U.S. Application Data

[63] Continuation-in-part of application No. 08/807,643, Feb. 27, 1997, Pat. No. 5,797,701.
[51] Int. Cl.$^6$ ............................... B09C 1/02; B09C 1/08; B01D 21/26
[52] U.S. Cl. .................. 210/759; 210/766; 210/768; 210/771; 210/772; 210/774; 210/787; 210/806; 405/128; 405/129
[58] Field of Search ................................. 210/759, 766, 210/768, 771, 772, 774, 781, 787, 806, 175, 177, 198.1, 200, 201, 202, 252, 259, 322, 360.1, 380.1, 205; 405/128, 129

[56] References Cited

U.S. PATENT DOCUMENTS 5,006,239  4/1991  Mishra ................................. 210/202
5,593,591  1/1997  Ohsol et al. ......................... 210/759

*Primary Examiner*—David A. Reifsnyder
*Attorney, Agent, or Firm*—Harris Beach & Wilcox LLP.

[57] ABSTRACT

Refinery waste feedstock is screened to remove large particles and is diluted to less than 5% solids weight percent to form a slurry. The slurry is agitated and heated to 180° F. or higher for a time sufficient to melt waxy petroleum solids, reduce the viscosity of the slurry, reduce the density of petroleum fractions within the slurry, and begin to break surface adhesion of petroleum to residual fines. The conditioned slurry is passed through a first disc/bowl centrifuge which separates more than 80% of the waste volume as a first liquid effluent containing most of the petroleum fractions from the original waste and which may be returned to the refinery for processing. The residual cake is diluted with hot water to form a second slurry and is treated with an amount of hydrogen peroxide for a time sufficient to lyse and/or liberate residual petroleum bound to inert fine particles and to oxidize toxic polycyclic aromatic hydrocarbons to non-toxic derivatives. The second slurry is passed through a second disc/bowl centrifuge, yielding a second liquid effluent which may be combined with the first liquid effluent. The residual cake, containing about 0.5% or less petroleum and about 70% solids, may be landfilled directly or further dewatered as needed to meet disposal requirements.

10 Claims, 1 Drawing Sheet

METHOD FOR PROCESSING OIL REFINING WASTE

The present application is a Continuation-In-Part of my application, Ser. No. 08/807,643 filed Feb. 27, 1997 now U.S. Pat. No. 5,797,701.

DESCRIPTION

The present invention relates to methods and apparatus for treatment of sludges and contaminated solids to recover hydrocarbons therefrom, and more particularly to a system (methods and apparatus) for processing of K-wastes from oil-contaminated sites such as refinery storage tanks, distillation columns, and soils to recover hydrocarbons therefrom and to render the residues suitable for environmentally-acceptable disposal.

Residual sludges are inherent in the storage and refining of petroleum. Depending upon the source of the crude oil, the petroleum feedstock delivered to a refinery may contain various non-refinable contaminants which typically may include silt, salt, sulfur, metals, and ash. The crude oil itself inherently contains small quantities of fine solids which can settle in the bottom of storage tanks and are so tightly bound to hydrocarbons as to resist conventional separation processes such as filtration and centrifugation. When petroleum feedstocks are refined in fractionation columns, various high molecular weight organic compounds and various inert components are condensed or trapped in the still bottoms.

The storage and distilling residues which are environmentally unsuitable for disposal are said to be "K-listed" by the US Environmental Protection Agency and are known in the refining art as "K-waste." As used herein, the term "refinery waste" means collectively the residuals of all petroleum acquisition, transporting, storing, and refining operations, and includes but is not limited to sludges, bottoms, waxes, oils, greases, and contaminated soils. The USEPA has imposed restrictions on disposal of these wastes, mandating that such waste must be treated to meet specific "Best Demonstrated Available Treatment" (BDAT) standards before the contaminated substrate may be disposed of, typically by landfill.

Over the past few years, disposal regulations have become more stringent and cost of processing petroleum-contaminated soils and sludges has escalated. Both of these trends may be expected to continue in the future. Current technologies for dealing with refinery waste are very expensive to implement and frequently are inadequate to meet current and future regulations.

"Landfarming," wherein natural degradation of petroleum waste is accomplished via biological reduction in impoundments, is slow, expensive, consumptive of space, requires elaborate mechanisms of control, and can fail ultimately to meet the requirements for reduction of high molecular weight hydrocarbons.

Processes to reduce the volume of material to be landfilled can remove up to 80–85% of the volume of raw waste. Various centrifugal separators and/or filtration systems can be used to separate out the dirt fraction from the liquid components, including water and oils for return to the refinery. However, achieving good filter separation typically requires the use of diatomaceous earth which produces a fluffy cake having a high petroleum content; and further, the dirt fraction of the filter cake still contains a high level of bound petroleum.

Where centrifugal decanter centrifuges are employed for separation and volume reduction, polymers typically are added ahead of the decanter to flocculate solids for easier settling. In some instances, solvents or "cutter stock" are added to reduce the viscosity of heavier fractions to improve separation. However, the thrust of this process generally is to return oil to the refinery within a given specification for bottom sediment and water (BS&W), and little regard is placed on the cleanup of the solid or cake fraction destined for disposal. Thus, landfill disposal of the solid residue is wasteful of its refinable petroleum content.

To remove further water and petroleum from the decanter cake, some treatment processes include an additional thermal desorption or outright incineration of the decanter cake. However, both processes are additionally expensive in being high in demand for maintenance, labor, and energy to meet current BDAT standards imposed under the Federal Resource Conservation and Recovery Act (RCRA), and incineration is wasteful and precludes further petroleum recovery from the cake. Further, adding either of these processes to the mechanical separation process is a, add-on approach and does not address the up-front problem of petroleum fractions tightly bound to finely-divided particles of silt and soil, or the potential commercial benefit of recovering those fractions.

Thus there is a need for a re-engineered complete process which is cognizant of the fundamental need to free petroleum fractions from silts and soils and which can provide a highly efficient and relatively inexpensive method for treating refinery wastes, including K-listed wastes, to separate virtually all the refinable petroleum fraction from the solids therein and to provide a residual solid fraction for disposal which can be delisted under RCRA guidelines.

It is a principal object of the invention to provide an improved process for treating refinery wastes which provides a residual solid fraction for disposal which can be delisted under RCRA guidelines.

It is a further object of the invention to provide an improved process for treating refinery wastes which can readily separate petroleum from silts and soils and thereby return a high percentage of the refinable petroleum fraction-therein to the refinery.

It is a still further object of the invention to provide an improved process for treating refinery wastes which is less expensive to operate on a per-unit of waste basis than known treatment processes.

It is a still further object of the invention to provide an improved process for treating refinery wastes which is easily retrofittable to existing facilities.

Briefly described, in a totally-engineered refinery waste treatment system embodying the invention, waste feedstock to be treated is screened to remove large particles and is diluted to a solids weight percent of less than 5% to form a waste-slurry. In a feed/mix tank, the slurry is agitated and heated to 180° F. or higher for a time sufficient to melt waxy petroleum solids, reduce the viscosity of the batch, reduce the density of petroleum fractions within the batch, and begin to break surface adhesion of petroleum to inert surfaces. The thus-conditioned slurry is treated by a first disc/bowl centrifuge. Greater than 80% of the waste volume is separated by the centrifuge, and the liquid effluent which contains most of the petroleum fractions from the original waste may be returned to the refinery for processing. In a reactor tank, the residual cake, which may contain about 5% or less of oil and grease, is diluted with hot water to form a second slurry and is treated with hydrogen peroxide in amount and for a time sufficient to lyse and liberate the petroleum fraction bound to fines in the waste and to oxidize toxic polycyclic aromatic hydrocarbons to non-toxic derivatives. The second slurry is treated by a second disc/bowl centrifuge. The liquid effluent is combined with the stream from the first centrifuge, and the residual cake which may contain about 0.5% or less of petroleum fractions and about 70% solids may be landfilled directly or further dewatered as needed to meet disposal requirements.

The foregoing and other objects, features, and advantages of the invention, as well as presently preferred embodiments thereof, will become more apparent from a reading of the following description in connection with the accompanying drawing of which FIG. 1 is a schematic diagram of a system for processing refinery waste in accordance with the invention.

The objectives of the subject process are:

a) to accommodate a refinery waste stream, including K-listed wastes, resulting, for example, from storage tank cleanings, storm runoff accumulations, slop tank washouts, still bottom residues, refinery soils, and the like, having a wide range of compositions and including varying percentages of light fractions, heavy fractions, asphaltines, carbon, silt, sand, salts, sulfur and sulfur compounds, and polycyclic aromatic hydrocarbons (PAH's);

b) to liberate and recover virtually all of the petroleum content of the waste stream and to return it to the refinery for processing into saleable products;

c) to carry out such liberation and recovery without resort to flocculants or filter aids such as diatomaceous earth or polymers;

d) to convert toxic substances in the waste stream into non-toxic derivatives;

e) to yield a residual solid which is substantially free of hydrocarbon residues (0.5% or less) and which may be delistable and is suitable for disposal in accordance with government regulations; and f) to meet all of the above objectives efficiently and economically.

Referring to FIG. 1, there is shown a refinery waste treatment system 10 embodying the invention. Since waste volumes to be treated can be relatively large, on the order of tens of thousands of barrels or more at a time, it is generally preferable to configure system 10 for continous throughput, although semi-continuous and batch systems are within the scope of the invention.

Waste feedstock 12 to be treated is diluted with water to a solids weight percent of less than 5% to form a waste slurry and then is passed through screen 14 to remove large particles, preferably a No. 10 sieve which removes particles larger than 2 mm in diameter. The removed particles are discarded as debris 16.

In a feed conditioning vessel 18, the slurry is agitated and heated to 180° F. or higher for a time sufficient to melt waxy petroleum solids, reduce the viscosity of the batch, reduce the density of petroleum fractions within the batch, and begin to break surface adhesion of petroleum to fine particles in the waste. A suitable length of conditioning will vary with the type, volume, and mix of wastes presented to the process.

Preferably, vessel 18 is provided with a narrow neck to minimize the surface area of the slurry and thereby to minimize the evolution of hydrocarbon gases therefrom. Vessel 18 is provided with either a controlled inert atmosphere or a controlled air flow in the headspace in the vessel to prevent the concentration of such gases from exceeding the lower explosive limit. Combustible evolved gases may be passed to the atmosphere or may be used advantageously as described hereinbelow.

The slurry in vessel 18 may be heated by steam jacket or, preferably, by direct injection of steam into the waste as supplied from a conventional steam generator (boiler) 20.

After conditioning is substantially complete, the conditioned slurry is treated by a first centrifuge 22, preferably a high-efficiency disc/bowl centrifuge as is known in the pharmaceutical manufacturing arts. Horizontal decanter centrifuges are known to be used in the refinery waste processing art for volume reduction, and they can achieve reasonably good quality of the liquid separation fraction. However, they have relatively low separating efficiencies and typically require the addition of flocculants or coagulating aids to the slurry to achieve adequate separation of solids. The resulting polymer floc can have a spongy structure which reduces cake density and retains unacceptably high levels of water and oils within the cake. It has been found that use of a disc/bowl centrifuge at this stage obviates the requirement for flocculation of the slurry and yields a much denser cake having relatively low liquid content, which is a stated objective of the invention. Centrifuge 22 may be of batch, semi-continuous, or continuous discharge design.

Greater than 80% of the waste volume is separated by the centrifuge 22, and the liquid effluent which contains most of the petroleum fractions from the original waste may be returned 24 to the refinery for processing.

The residual cake typically is not yet suitable for landfill disposal and requires further processing or conversion. In a reactor tank 26, the cake, which may contain about 5% oil and grease, is agitated and diluted with hot water 28, preferably at about 180° F. or higher to form a second slurry and is treated with hydrogen peroxide 30 in an amount and for a time sufficient to lyse and/or liberate the residual petroleum still bound to fines in the cake. Long-chain hydrocarbons are converted to shorter-chain molecules forming a lighter petroleum fraction suitable for re-submission to the refinery. This treatment step also oxidizes toxic polycyclic aromatic hydrocarbons to non-toxic derivatives, for example, naphthalene and anthracene may be oxidized to naphthaquinone and anthraquinone, respectively. Some volatile hydrocarbon release is generated during this conversion stage requiring controlled venting of tank 26. Advantageously, these gaseous hydrocarbons may be captured and burned to fuel steam generator 20 along with similar volatiles from feed digestion vessel 18, or they may be passed to the atmosphere. Addition of water and hydrogen peroxide may be on a batch, semi-continous, or continous feed basis. A plurality of reactor tanks 26a like reactor tank 26 may be employed in parallel with tank 26 to increase the throughput capacity of the overall waste processing system.

Upon completion of the reactor stage in tank 26, the second slurry is fed to a second centrifuge 32, again preferably a disc/bowl centrifuge, to remove light petroleum fractions generated during the reactor stage. The liquid effluent may be combined with the stream from the first centrifuge 22, and the residual cake which may contain about 0.5% or less petroleum fractions and about 70% solids may be disposed of directly 34 or further dewatered 36 and/or dried by known means as needed to meet disposal requirements.

EXAMPLE

A crude oil storage tank has a bottom sludge buildup consisting of 50% inert solids and 50% petroleum compounds and amounting to 20,000 barrels. Pressure water blasting and vacuum truck removal is selected to clean the tank for inspection and deinventorying of waste. Tank cleaning requires 80,000 barrels of water, resulting in a total of 100,000 barrels of liquid petroleum waste. In gravimetric terms, the waste comprises 1890 tons (10.66%) of inert solids, 1890 tons (10.66%) of petroleum compounds, and 13,944 tons (78.67%) of wash water.

If containment capacity is available, the waste is allowed to settle and stratify and about 50% of the water volume is decanted and discarded. The remaining 50% of the waste is treated in a continuous processing system in accordance with the system described hereinabove.

Processing cost of 100,000 barrels at, for example, $4.20 per barrel is $420,000. Disposal cost of 1890 tons of inert solids at, for example, $210 per ton is $400,000. Total handling costs are $820,000.

Comparing the cost of treatment in accordance with the invention to expected costs incurrable using known technologies for the same waste, direct offsite incineration in a commercial liquid phase incinerator is estimated to cost at least $3 million and could be as high as $5 million depending upon difficulty in handling a particular sludge in a liquid injection incinerator; volume reduction and drying followed by offsite solids phase commercial incineration is estimated to cost at least $2.5 million; volume reduction with thermal desorption of the residual cake is estimated to cost at least $2.0 million; and volume reduction with BTU enhancement (addition of a sacrificial petroleum fraction) to improve burning is estimated to cost at least $2.3 million.

From the foregoing description it will be apparent that there has been provided an improved system (method and apparatus) for processing refinery wastes to recover residual petroleum therein and to prepare residual solids for environmentally-acceptable disposal, wherein refinery wastes are conditioned in hot water; subjected to first centrifugation in a first disc/bowl centrifuge to separate a refinable liquid from a first cake; subjected to hydrogen peroxide conversion to lyse and/or liberate petroleum compounds from inert solids and to convert toxic compounds into non-toxic derivatives; and subjected to second centrifugation in a second disc/bowl centrifuge to separate the liberated petroleum compounds for refining and to yield a semi-dry cake suitable for direct disposal or further dewatering. Variations and modifications of the herein described system, in accordance with the invention, will undoubtedly suggest themselves to those skilled in this art. Accordingly, the foregoing description should be taken as illustrative and not in a limiting sense.

What is claimed is:

1. A method for treating an aqueous slurry of refinery wastes to provide effluent from which petroleum products may be recovered and a cake which is substantially free of hydrocarbon residues, comprising the steps of:

a) heating said waste slurry to a temperature of at least about 180° F. to form a hot sludge;

b) maintaining said slurry at said temperature for a period of time sufficient to digest said hot sludge, said digestion including melting any entrained petroleum solids, reducing the apparent viscosity of the slurry, and reducing the density of petroleum fractions in said slurry;

c) passing said hot digested slurry through a first centrifuge to separate a first liquid effluent containing liquid petroleum fractions from a first cake containing bound petroleum residues;

d) dispersing said first cake in water to form a second slurry;

e) treating said second slurry by adding an amount of hydrogen peroxide thereto to lyse and liberate said bound petroleum residues from inert solids contained in said first cake; and f) passing said second slurry through a second centrifuge to separate a second liquid effluent containing petroleum fractions from a second cake, said second cake containing said inert solids and being substantially free of hydrocarbon residues.

2. A method in accordance with claim 1 further comprising the step of adjusting the weight of solids in said waste to about 5 percent or less prior to said heating step.

3. A method in accordance with claim 1 further comprising the step of passing said aqueous slurry through a screen to remove large particles therefrom prior to said heating step.

4. A method in accordance with claim 1 further comprising the step of directing said first and second liquid effluents to a refinery.

5. A method in accordance with claim 1 wherein said second cake contains residual water after being formed in said second centrifugation step, further comprising the step of further dewatering said second cake after said second centrifugation step.

6. A method in accordance with claim 1 wherein said treating step includes oxidizing polycyclic aromatic hydrocarbons in said second slurry.

7. A method in accordance with claim 1 wherein said heating step includes injection of steam into said slurry.

8. A method in accordance with claim 1 wherein at least one of said first and second centrifuges is a disc/bowl centrifuge.

9. A method in accordance with claim 1 wherein said waste slurry comprises residuals resulting from activities selected from the group consisting of petroleum acquisition, petroleum transporting, petroleum storing, petroleum refining, and combinations thereof, said residuals being selected from the group consisting of sludges, bottoms, waxes, oils, greases, contaminated soils, and mixtures thereof.

10. A method in accordance with claim 1 wherein said water in said dispersing step is heated.

* * * * *